No. 748,656. PATENTED JAN. 5, 1904.
W. C. SABIN.
MACHINE FOR PICKING EARS OF CORN.
APPLICATION FILED SEPT. 26, 1903.
NO MODEL.

Witnesses
R. A. Boswell
A. L. Hough

Inventor
W. C. Sabin,
By Franklin N. Hough
Attorney

No. 748,656. Patented January 5, 1904.

UNITED STATES PATENT OFFICE.

WILLARD C. SABIN, OF LAUREL, NEBRASKA.

MACHINE FOR PICKING EARS OF CORN.

SPECIFICATION forming part of Letters Patent No. 748,656, dated January 5, 1904.

Application filed September 26, 1903. Serial No. 174,796. (No model.)

*To all whom it may concern:*

Be it known that I, WILLARD C. SABIN, a citizen of the United States, residing at Laurel, in the county of Cedar and State of Nebraska, have invented certain new and useful Improvements in Machines for Picking Ears of Corn; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a corn-picking machine, and particularly to a structure adapted to remove an ear of corn from the stalk in the passage of the machine through the field.

The invention has for an object to obviate the use of knives and other cutting devices and to provide parallel rolls adapted to rotate in opposite directions and beveled at the feed end thereof, so as to engage the stalk at the base of the ear of corn.

Other objects and advantages of the invention will be hereinafter set forth, and the novel features thereof defined by the appended claim.

Figure 1:
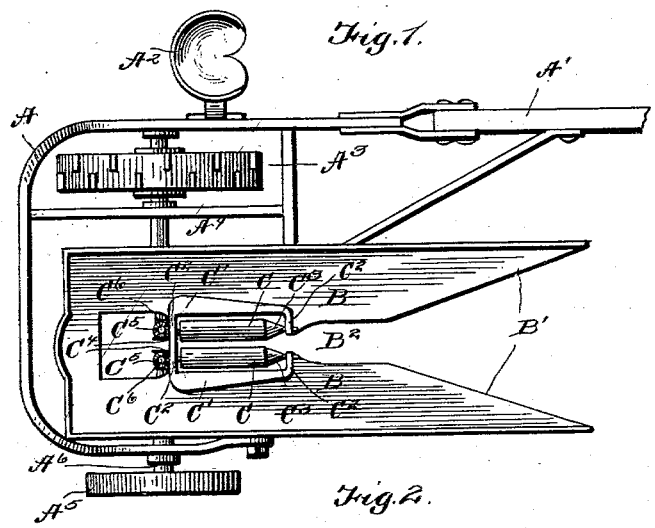
Figure 2:
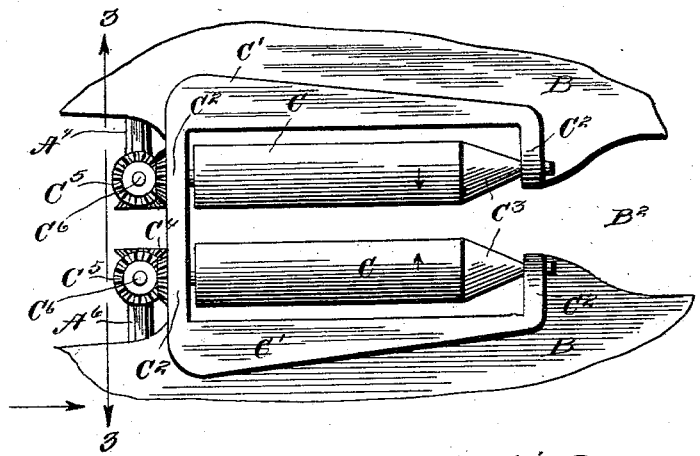
Figure 3:
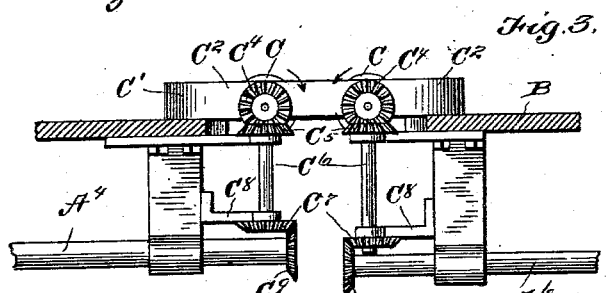

In the drawings, Figure 1 is a plan of the machine. Fig. 2 an enlarged detail plan of the ear-pulling mechanism, and Fig. 3 is a section on line 3 3 of Fig. 2.

Like letters of reference refer to like parts in the several figures of the drawings.

The ear-picking mechanism may be mounted upon any suitable machine and rotated in any desired manner, but for the purpose of illustrating a desirable form thereof a carrier-frame A is shown in Fig. 1, having the traction-pole A' and seat $A^2$ applied thereto. Mounted in this frame is a traction-wheel $A^3$ upon a driving-shaft $A^4$, while at the opposite side of the machine a bearing-wheel $A^5$ is secured to a driving-shaft $A^6$. The inner ends of these shafts may be provided with suitable gearing for driving the picking-rolls, as hereinafter described. At the upper portion of the machine a table or platform B is located and formed with an inclined opening B', leading to the throat $B^2$, where the picking-rolls C are disposed. These rolls are of any desired material and mounted at their opposite ends in a suitable frame or yoke C', having bearing portions $C^2$ for receiving the spindles of the rolls, while the forward end of each roll is suitably beveled or tapered, as shown at $C^3$, for the purpose of facilitating the introduction of the stalk of corn between the same.

The rolls are rotated in opposite directions toward each other by means of beveled gears $C^4$, upon the spindles of the rolls beyond the bearing of the frame, and these gears mesh with a driving-pinion $C^5$ upon a shaft $C^6$, which is provided at its lower end with a corresponding pinion $C^7$. The shaft $C^6$ may be mounted in any suitable form of bracket, as shown at $C^8$, and for the purpose of producing an opposite rotating of the rolls one of the shafts is of less length than the other—for instance, when the driving-wheels are of different diameters and the shafts thereof mounted in different horizontal planes. Each of these shafts is provided with driving-gears $C^9$, meshing with the gear $C^7$, so as to cause the rolls C to rotate in opposite directions toward each other.

In the operation of the invention the machine in passing through a field receives the stalk at the open end of the table, while it is drawn between the rolls at the tapered ends thereof in the passage of the machine, and the rotary movement of said rolls removes the ear from the stalk and carries it toward the sides of the table. The mounting of these rolls in the frames permits them to be removed and replaced by others whenever found desirable, while the rotary movement thereof materially assists in the picking action of removing the ears from the stalks, while after the passage of the machine the stalks are left standing in the field.

It will be obvious that changes may be made in the details of construction and configuration without departing from the spirit of the invention as defined in the appended claim.

Having thus fully described my invention, what I claim as new, and desire to secure by Letters Patent, is—

A corn-picking machine comprising a frame having suitable driving-shafts, a table mounted upon said frame which is recessed in from one end forming a rectangular outlined opening at the inner end of said recessed portion, with the marginal edges of the recess leading to said opening tapered, a yoke mounted upon said table and about the marginal edges of said opening, parallel rollers journaled in said yoke, a gear-wheel carried by the shaft of each roller, and gear connections between the driving-shafts and said gear-wheels, as to set forth.

In testimony whereof I hereunto affix my signature in presence of two witnesses.

WILLARD C. SABIN.

Witnesses:
   LOU SIMPSON,
   J. H. COBURN.